(12) United States Patent
Fujii et al.

(10) Patent No.: US 8,372,257 B2
(45) Date of Patent: Feb. 12, 2013

(54) ELECTRODEPOSITION COATING MATERIAL AND ELECTRODEPOSITION METHOD

(75) Inventors: Masanori Fujii, Amagasaki (JP);
Toshihiro Zushi, Amagasaki (JP);
Hiromasa Honjo, Amagasaki (JP);
Toyokazu Nagato, Amagasaki (JP);
Maw Soe Win, Yokohama (JP);
Shintaro Nakajima, Yokohama (JP);
Toshiyuki Goshima, Yokohama (JP);
Kiyoshi Ishii, Yokohama (JP)

(73) Assignees: Mitsubishi Cable Industries, Ltd., Tokyo (JP); PI R&D Co., Ltd., Kanagawa (JP)

( * ) Notice: Subject to any disclaimer, the term of this patent is extended or adjusted under 35 U.S.C. 154(b) by 616 days.

(21) Appl. No.: 12/451,336

(22) PCT Filed: May 7, 2008

(86) PCT No.: PCT/JP2008/058462
§ 371 (c)(1),
(2), (4) Date: Jan. 4, 2010

(87) PCT Pub. No.: WO2008/139990
PCT Pub. Date: Nov. 20, 2008

(65) Prior Publication Data
US 2010/0108533 A1     May 6, 2010

(30) Foreign Application Priority Data

May 7, 2007  (JP) .................................. 2007-122723

(51) Int. Cl.
*C25D 13/06*   (2006.01)
*C08G 77/26*   (2006.01)

(52) U.S. Cl. .............................. 204/498; 528/22; 528/38
(58) Field of Classification Search .................. 204/492, 204/498; 528/22, 38
See application file for complete search history.

(56) References Cited

FOREIGN PATENT DOCUMENTS

| JP | 9-104839 | 4/1997 |
|---|---|---|
| JP | 2003-239099 | 8/2003 |
| JP | 2005-162954 | 6/2005 |
| JP | 2005-174561 | 6/2005 |

OTHER PUBLICATIONS

International Search Report issued Aug. 5, 2008 in International (PCT) Application No. PCT/JP2008/058462.
"Technology of Automobile Body Manufacture", edited by Shizhen Deng et al., Beijing Institute of Technology Press, Sep. 1997, First Edition, pp. 192-193 (with English translation).

*Primary Examiner* — Kishor Mayekar
(74) *Attorney, Agent, or Firm* — Wenderoth, Lind & Ponack, L.L.P.

(57) ABSTRACT

A suspension type electrodeposition coating composition containing, as a resin component, block copolyimide having a siloxane bond in a molecular structure and an anionic group in a molecule. Preferably, the above-mentioned block copolyimide contains, as one of the diamine components, diamine having a siloxane, bond in a molecular structure. In addition, preferably, the above-mentioned anionic group is a carboxylic acid group or a salt thereof and/or a sulfonic acid group or a salt thereof. The electrodeposition coating composition has superior heat resistance, which does not easily develop peeling and cracks in the electrodeposited body, and is capable of efficiently forming a high-insulation electrodeposited film superior in the uniformity of film property.

13 Claims, No Drawings

ELECTRODEPOSITION COATING MATERIAL AND ELECTRODEPOSITION METHOD

This application is a U.S. national stage of International Application No. PCT/JP2008/058462 filed May 7, 2008.

TECHNICAL FIELD

The present invention relates to a suspension type electrodeposition coating composition and an electrodeposition method of the electrodeposition coating composition.

BACKGROUND ART

Conventionally, as a coating method by electrodeposition of polyimide, a method is known which includes dissolving polyamic acid, which is a polyimide precursor, in an organic polar solvent, adding a poor solvent and water, performing electrodeposition using the obtained aqueous dispersion type solution for electrodeposition, and heating the electrodeposited film at 240-260° C. to give an imide film (patent documents 1-3). Aqueous polyamic acid dispersion for electrodeposition has poor preservation stability since polyamidic acid is easily decomposed, and moreover, the electrodeposited coating film requires a high temperature treatment for imidation. In addition, As described in patent document 4, there is a method capable of electrodeposition by introducing carboxylic acid into polyimide wherein polyamic acid is directly imidated. However, the method is not entirely satisfactory in terms of resistance to the development of peeling and cracks in the electrodeposited film. In addition, an electrodeposition coating composition containing solvent-soluble polyimide and a hydrophilic polymer in the same particle is described in patent document 5, and use of diamino organosiloxane as a diamine component is also described. However, the resistance to the development of peeling and cracks in the electrodeposited film is not satisfactory. Furthermore, patent document 6 describes a polyimide silicone type resin composition. However, the composition is not an electrodeposition composition and is associated with problems of the above-mentioned instability and the need of a high temperature treatment due to the use of polyamic acid. Therefore, the Applicants have already proposed an electrodeposition coating composition having superior heat resistance, which is capable of solving such problems in the prior art and forming, on a body to be electrodeposited, a highly reliable high-insulation electrodeposited film that resists development of peeling and cracks and an electrodeposition method using the composition (patent document 7). However, since the electrodeposition coating composition consists of a mixture of several kinds of solvents, it is defective in that the behavior as an electrodeposition coating greatly varies depending on a slight change in the mixing ratio of the solvents, restriction of the use environment such as temperature, vapor amount and the like is severe, and the film property after electrodeposition coating tends to be nonuniform. In addition, its slow electrodeposition speed causes low electrodeposition efficiency, and an electrodeposited film having a sufficiently large thickness cannot be afforded.

patent document 1: JP-A-49-52252
patent document 2: JP-A-52-32943
patent document 3: JP-A-63-111199
patent document 4: JP-A-9-104839
patent document 5: JP-A-2000-178481
patent document 6: JP-A-2003-213129
patent document 7: JP-A-2005-162954
patent document 8: WO99/19771
patent document 9: U.S. Pat. No. 5,502,143

DISCLOSURE OF THE INVENTION

Problems to be Solved by the Invention

In view of the above-mentioned situation, the problem to be solved by the present invention is to provide an electrodeposition coating composition having superior heat resistance, which does not easily develop peeling and cracks in the electrodeposited body, and is capable of efficiently forming a high-insulation electrodeposited film superior in the uniformity of film property, and an electrodeposition method of the electrodeposition coating composition.

In addition, the problem is to provide an electrodeposition coating composition having superior heat resistance, which does not easily develop peeling and cracks in the electrodeposited body, and is capable of efficiently forming a high-insulation electrodeposited film having a sufficiently large thickness (preferably 20 μm or above), and an electrodeposition method of the electrodeposition coating composition.

Means of Solving the Problems

The present inventors have conducted intensive studies in an attempt to solve the above-mentioned problems, and found that, by controlling the composition of a solvent to be used with a block copolyimide having a siloxane bond in a molecular structure and an anionic group in a molecule and adjusting the temperature conditions and the like for preparing a paint, a suspension paint comprising the aforementioned block copolyimide dispersed as precipitated particles having a comparatively large particle size can be obtained, and that the thus-obtained paint has a high electrodeposition speed and can form an electrodeposited film in a short time, which shows a high level of uniformity of the film property, and an electrodeposited film having a film thickness of the level conventionally difficult to achieve, which resulted in the completion of the present invention.

Accordingly, the present invention provides the following.
(1) A suspension type electrodeposition coating composition comprising block copolyimide having a siloxane bond in a molecular structure and an anionic group in a molecule as a resin component.
(2) The suspension type electrodeposition coating composition of the above-mentioned (1), wherein the aforementioned block copolyimide comprises, as one of the diamine components, diamine having a siloxane bond in a molecular structure.
(3) The suspension type electrodeposition coating composition of the above-mentioned (2), wherein the diamine is one or more kinds selected from the group consisting of bis(4-aminophenoxy)dimethylsilane, 1,3-bis(4-aminophenoxy)-1,1,3,3-tetramethyldisiloxane and a compound represented by the following formula (I):

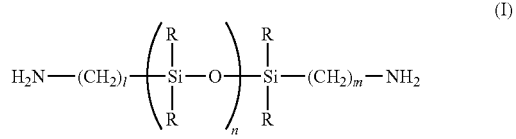

wherein four R's are each independently an alkyl group, a cycloalkyl group, a phenyl group or a phenyl group substituted by 1 to 3 alkyl groups or alkoxyl groups, l and m are each independently an integer of 1-4, and n is an integer of 1-20.

(4) The suspension type electrodeposition coating composition of the above-mentioned (3), wherein the four R's in the aforementioned formula (1) are each independently an alkyl group having a carbon number of 1 to 6, a cycloalkyl group having a carbon number of 3 to 7, a phenyl group, or a phenyl group substituted by 1 to 3 alkyl groups having a carbon number of 1 to 6 or 1 to 3 alkoxyl groups having a carbon number of 1 to 6.

(5) The suspension type electrodeposition coating composition of any of the above-mentioned (1)-(4), wherein the aforementioned anionic group is a carboxylic acid group or a salt thereof, and/or a sulfonic acid group or a salt thereof.

(6) The suspension type electrodeposition coating composition of the above-mentioned (5), wherein the aforementioned block copolyimide comprises, as one of the diamine components, aromatic diaminocarboxylic acid.

(7) The suspension type electrodeposition coating composition of the above-mentioned (6), wherein, in the total diamine component, the proportion of the diamine is 5-90 mol % and the proportion of the aforementioned aromatic diaminocarboxylic acid is 10-70 mol %, provided that the total of the both is 100 mol % or below and a third diamine component may be contained.

(8) The suspension type electrodeposition coating composition of any of the above-mentioned (1)-(7), which comprises the aforementioned block copolyimide, a basic compound, a water-soluble polar solvent, water and a poor solvent for the aforementioned block copolyimide, wherein the content ratio of the water-soluble polar solvent is 25-60 wt %, the content ratio of water is 10-30 wt %, the content ratio of the poor solvent is 10-40 wt %, and the content ratio of the basic compound is 30-200% of the stoichiometric amount necessary to neutralize an acid group in the aforementioned block copolyimide, and the concentration of the block copolyimide is 1-15 wt %.

(9) The suspension type electrodeposition coating composition of the above-mentioned (8), wherein the aforementioned poor solvent for the block copolyimide is alkoxy-substituted aliphatic alcohol.

(10) The suspension type electrodeposition coating composition of the above-mentioned (8), wherein the aforementioned basic compound is a basic nitrogen-containing compound.

(11) The suspension type electrodeposition coating composition of the above-mentioned (10), wherein the aforementioned basic nitrogen-containing compound is a nitrogen-containing heterocyclic compound.

(12) An anion type electrodeposition method comprising immersing a body to be electrodeposited, which is comprised of a member having at least a conductive surface, in the suspension type electrodeposition coating composition of any of the above-mentioned (1)-(11) and passing an electric current using the body to be electrodeposited as a positive electrode to form a polyimide coating film on the body to be electrodeposited.

(13) The suspension type electrodeposition coating composition of the above-mentioned (8), wherein the block copolyimide dispersed in the suspension has an average particle size of 0.5-5 μm with a standard deviation of 0.3-3 μm.

(14) The suspension type electrodeposition coating composition of the above-mentioned (8), capable of forming a polyimide coating at 15-250 μm per coulomb by electrodeposition using a copper wire with φ 1.0 mm and length 20 cm.

(15) The suspension type electrodeposition coating composition of the above-mentioned (8), having a log inherent viscosity of 5-100 mPas.

Effect of the Invention

The suspension type electrodeposition coating composition of the present invention (hereinafter sometimes to be simply referred to as an "electrodeposition coating composition") can form a highly heat resistant, high insulation film having a high extension percentage and superior adhesiveness and property uniformity in a short time on, for example, a surface of a member (body to be electrodeposited) requiring heat protection and insulation protection in various technical fields such as automobile parts, home electric appliances, electric and electronic materials, building materials and the like. Using such electrodeposition coating composition of the present invention, therefore, an insulation member (part) having sufficient heat and insulation protection can be efficiently produced.

In addition, since an electrodeposited film having an extremely large thickness (e.g., thickness of 30 μm or above) can be formed using the suspension type electrodeposition coating composition of the present invention, an insulation member (part), which is not only heat and insulation protected but also scratch-protected, can be produced easily.

BEST MODE FOR CARRYING OUT THE INVENTION

The present invention is explained in the following by referring to preferable embodiments.

The electrodeposition coating composition of the present invention comprises, as a resin component, block copolyimide having a siloxane bond (—Si—O—) in a molecular structure (i.e., main chain of polyimide) and an anionic group in a molecule.

Here, the "block copolyimide" means copolymerized polyimide obtained by heating tetracarboxylic acid dianhydride and diamine to form an imide oligomer (first stage reaction), and then adding tetracarboxylic acid dianhydride which is the same as or different from the aforementioned tetracarboxylic acid dianhydride and/or diamine different from the aforementioned diamine to allow reaction (second stage reaction), whereby preventing random copolymerization caused by the exchange reaction that occurs between amic acids.

In the present invention, in block copolyimide having a siloxane bond in the main chain of polyimide and an anionic group in a molecule, the siloxane bond in the main chain may be a siloxane bond derived from a tetracarboxylic acid dianhydride component or a siloxane bond derived from a diamine component, preferably a siloxane bond derived from a diamine component. Generally, a block copolyimide obtained using, in at least a part of the diamine component, a diamine compound having a siloxane bond (—Si—O—) in a molecular structure (hereinafter sometimes to be referred to as a "siloxane bond-containing diamine") is used.

In the present invention, the siloxane bond-containing diamine is not particularly limited and any can be used as long as it can be imidized with tetracarboxylic acid dianhydride. Examples thereof include bis(4-aminophenoxy)dimethylsilane, 1,3-bis(4-aminophenoxy)-1,1,3,3-tetramethyldisiloxane and a compound represented by the formula (I):

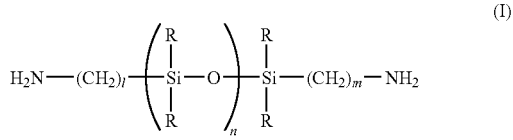

(I)

wherein 4 R's are each independently an alkyl group, a cycloalkyl group, a phenyl group or a phenyl group substituted by 1 to 3 alkyl groups or alkoxyl groups, l and m are each independently an integer of 1-4, and n is an integer of 1-20. The compound represented by the formula (I) includes a single compound wherein n is 1 or 2 and polysiloxane diamine.

In each of the 4 R's in the formula (I), the alkyl group and the cycloalkyl group preferably have a carbon number of 1 to 6, more preferably 1 or 2. In addition, 1 to 3 alkyl groups or alkoxyl groups of the phenyl group substituted by 1 to 3 alkyl groups or alkoxyl groups may be the same or different when the number thereof is 2 or 3. Furthermore, the alkyl group and the alkoxyl group each preferably have a carbon number of 1 to 6, more preferably 1 or 2.

In the compound represented by the formula (I), the 4 R's in the formula are preferably alkyl groups (particularly methyl groups) or phenyl groups. In addition, polysiloxane diamine wherein l and m are 2-3, and n is 5-15 is preferable.

Preferable examples of the polysiloxane diamine include bis(γ-aminopropyl)polydimethyl siloxane (the formula (I) wherein l and m are 3, and 4 R's are methyl groups) and bis(γ-aminopropyl)polydiphenylsiloxane (the formula (I) wherein l and m are 3, and 4 R's are phenyl groups).

In the present invention, as the siloxane bond-containing diamine, any one compound alone may be used, or two or more kinds may be used in combination. Such siloxane bond-containing diamine may be a commercially available product, and those manufactured by Shin-Etsu Chemical Co., Ltd., Toray Co., Ltd.—Dow Corning, and Chisso Corporation can be directly used. Specific examples thereof include KF-8010 (bis(γ-aminopropyl)polydimethyl siloxane: about 450 amino group equivalent) manufactured by Shin-Etsu Chemical Co., Ltd., X-22-161A (bis(γ-aminopropyl)polydimethyl siloxane: about 840 amino group equivalent) and the like. These are particularly preferable.

In the present invention, the anionic group is a group that becomes anionic in a solvent (mentioned later) of the electrodeposition composition. Preferred is a carboxyl group or a salt thereof, and/or a sulfonic acid group or a salt thereof. While the diamine containing siloxane or tetracarboxylic acid dianhydride component may have the anionic group, diamine having the anionic group is preferably used as one of the diamine components. To improve heat resistance of polyimide, adhesion to a body to be electrodeposited and the degree of polymerization, such an anionic group-containing diamine is preferably aromatic diamine. In other words, aromatic diaminocarboxylic acid and/or aromatic diaminosulfonic acid are/is preferable. Examples of the aromatic diaminocarboxylic acid include 3,5-diaminobenzoic acid, 2,4-diaminophenylacetic acid, 2,5-diaminoterephthalic acid, 3,3'-dicarboxy-4,4'-diaminodiphenylmethane, 3,5-diamino-p-toluic acid, 3,5-diamino-2-naphthalenecarboxylic acid, 1,4-diamino-2-naphthalenecarboxylic acid and the like. Examples of the aromatic diaminosulfonic acid include 2,5-diaminobenzenesulfonic acid, 4,4'-diamino-2,2'-stilbene disulfonic acid, o-tolidine disulfonic acid and the like. Of these, 3,5-diaminobenzoic acid is particularly preferable. Such anionic group-containing aromatic diamine may be used alone, or two or more kinds may be used in combination. When the siloxane bond-containing diamine has an anionic group, the diamine component may be siloxane bond-containing diamine alone.

As the diamine component, other diamine may be further added besides the above-mentioned siloxane bond-containing diamine and diaminocarboxylic acid. As such diamine, aromatic diamine is generally used to improve heat resistance of polyimide, adhesion to a body to be electrodeposited and the degree of polymerization. Examples of such aromatic diamine include m-phenylenediamine, p-phenylenediamine, 2,4-diaminotoluene, 4,4'-diamino-3,3'-dimethyl-1,1'-biphenyl, 4,4'-diamino-3,3'-dihydroxy-1,1'-biphenyl, 3,4'-diaminodiphenylether, 4,4'-diaminodiphenylether, 3,3'-diaminodiphenylsulfone, 4,4'-diaminodiphenylsulfone, 4,4'-diaminodiphenylsulfide, 2,2-bis(4-aminophenyl)propane, 2,2-bis(4-aminophenyl)hexafluoropropane, 1,3-bis(4-aminophenoxy)benzene, 1,4-bis(4-aminophenoxy)benzene, 4,4'-bis(4-aminophenoxy)biphenyl, 2,2-bis[4-(4-aminophenoxy)phenyl]propane, 2,2-bis[4-(4-aminophenoxy)phenyl]hexafluoropropane, bis[4-(3-aminophenoxy)phenyl]sulfone, bis[4-(4-aminophenoxy)phenyl]sulfone, 2,6-diaminopyridine, 2,6-diamino-4-methylpyridine, 4,4'-(9-fluorenylidene)-dianiline and α,α-bis(4-aminophenyl)-1,3-diisopropylbenzene. Of these, bis[4-(3-aminophenoxy)phenyl]sulfone and bis[4-(4-aminophenoxy)phenyl]sulfone are more preferable.

In the total diamine component, the proportion of the aforementioned siloxane bond-containing diamine is preferably 5-90 mol %, more preferably 15-50 mol %. When the siloxane bond-containing diamine unit is less than 5 mol %, the electrodeposition coating film of polyimide unpreferably shows poor extension percentage, cannot achieve sufficient flexibility with ease, and tends to develop peeling and cracks. In addition, the proportion of the aforementioned aromatic diaminocarboxylic acid or a salt thereof is preferably 10-70 mol % provided that the total of the both is 100 mol % or below and a third diamine component may be contained, as mentioned above.

As the tetracarboxylic acid dianhydride component in polyimide, aromatic tetracarboxylic acid dianhydride is generally used from the aspects of heat resistance of polyimide and compatibility of polysiloxane diamine. Examples thereof include pyromellitic acid dianhydride, 3,3',4,4'-biphenyltetracarboxylic acid dianhydride, bis(3,4-dicarboxyphenyl) ether dianhydride, 3,3',4,4'-benzophenonetetracarboxylic acid dianhydride, bicyclo[2.2.2]oct-7-ene-2,3,5,6-tetracarboxylic acid dianhydride, 2,2-bis(3,4-dicarboxyphenyl) hexafluoropropane dianhydride, 3,3',4,4'-biphenylsulfonetetracarboxylic acid dianhydride and the like. Of these, particularly preferable examples include 3,3',4,4'-biphenyltetracarboxylic acid dianhydride, bis(3,4-dicarboxyphenyl)ether dianhydride, 3,3',4,4'-benzophenonetetracarboxylic acid dianhydride and 3,3',4,4'-biphenylsulfonetetracarboxylic acid dianhydride, from the aspects of heat resistance of polyimide, adhesion to a body to be electrodeposited, compatibility of polysiloxane diamine and polymerization rate. Any one kind of the exemplified tetracarboxylic acid dianhydrides may be used alone, or two or more kinds may be used in combination.

Polyimide used as the resin component of the composition of the present invention is block copolyimide soluble in a water-soluble polar solvent (e.g., dissolution property as evidenced by solubility at a concentration of not less than 5 wt %, preferably not less than 10 wt %, in N-methyl-2-pyrrolidone (NMP)). The block copolyimide and a production method thereof are already known (e.g., described in the aforementioned patent documents 8 and 9), and polyimide to be used in the present invention can also be produced according to a known method using the above-mentioned diamine component and tetracarboxylic acid dianhydride. For the polymerization reaction, a water-soluble polar solvent is used. Specifically, one or more kinds selected from N,N-dimethylformamide (DMF), N,N-dimethylacetamide (DMAc), dimethyl sulfoxide (DMSO), N-methylpyrrolidone (NMP), γ-butyrolactone (yBL), anisole, tetramethylurea and sulfolane can be mentioned. Of these, NMP is preferable. Almost equimolar amounts (preferably 1:0.95-1.05 at a molar ratio) of tetracarboxylic acid dianhydride and diamine are added to such a water-soluble polar solvent, and the mixture was heated in the presence of a catalyst to perform a dehydrative imidation reaction, whereby a polyimide solution is directly produced. The catalyst is a composite catalyst consisting of two components of lactone and a base, or crotonic acid and a base. Lactone is preferably γ-valerolactone, and the base is preferably pyridine or N-methylmorpholine. The mixing ratio of lactone or crotonic acid and a base is 1:1-5 (molar equivalents), preferably 1:1-2. When water is present, a double salt of acid-base shows a catalyst action to complete imidation and the catalyst action is lost when water is removed from the reaction system (preferably, polycondensation reaction is performed in the presence of toluene, and the water formed is removed from the reaction system together with toluene). The amount of the catalyst to be used is generally 1/100-1/5 mol, preferably 1/50-1/10 mol, relative to tetracarboxylic acid dianhydride. The mixing ratio (molar ratio) of tetracarboxylic acid dianhydride and diamine (acid/diamine) to be subjected to the above-mentioned imidation reaction is preferably about 1.05-0.95. In addition, the concentration of the acid dianhydride in the total reaction mixture at the time of the start of the reaction is preferably about 4-16 wt %, the concentration of lactone or crotonic acid is preferably about 0.2-0.6 wt %, the concentration of the base is about 0.3-0.9 wt %, and the is concentration of toluene is preferably about 6-15 wt %. The reaction temperature is preferably 150° C.-220° C. While the reaction time is not particularly limited and varies depending on the molecular weight etc. of polyamide to be produced, it is generally about 180-900 min. In addition, the reaction is preferably performed under stirring.

Acid dianhydride and diamine are heated in a water-soluble polar solvent in the presence of the above-mentioned two-component type acid catalyst to form an imide oligomer, to which acid dianhydride and/or diamine are/is added to allow a second stage reaction, whereby polyimide can be formed. This method can prevent random copolymerization caused by an exchange reaction that occurs between amic acids. As a result, block copolyimide can be produced. The concentration of the solid content is preferably 10-40 wt %, more preferably 20-30 wt %.

Polyimide preferably has a log inherent viscosity (25° C.) of 5000-50000 mPas, more preferably 5000-15000 mPas, when a 20 wt % NMP solution is used.

The weight average molecular weight (Mw) of block copolyimide to be used as a resin component is preferably 20,000-150,000, particularly preferably 45,000-90,000, based on polystyrene. When the weight average molecular weight of polyimide is less than 20,000, the heat resistance of electrodeposition coating film tends to decrease, the coating film surface is roughened, and the aesthetic quality and voltage resistance property tend to be degraded. In addition, when the weight average molecular weight exceeds 150,000, the polyimide resin acquires water repellency and tends to induce gelling during the production step of a solution for electrodeposition (paint).

The number average molecular weight (Mn) is preferably 10,000-70,000, more preferably 20,000-40,000, based on polystyrene. When the number average molecular weight is less than 10,000, the electrodeposition efficiency tends to be degraded, and the heat resistance and voltage resistance may be degraded. Here, the molecular weight of polyimide is measured by GPC and based on polystyrene. The molecular weight is measured using HLC-8220 manufactured by Tosoh Corporation as a GPC apparatus and SCkgel Super-H-RC as a column.

The electrodeposition coating composition of the present invention is a suspension electrodeposition coating. In the present invention, the "suspension type electrodeposition coating composition" comprises polyimide particles having a particle size of 0.1-10 μm and the standard deviation of the particle size of 0.1-8 μm dispersed therein, as measured using a particle size analyzer ELS-Z2 (manufactured by Otsuka Electronics Co., Ltd.) according to an electrophoretic light scattering method (Laser Doppler method), and analyzed by cumulant analysis.

The inherent relative viscosity of the suspension type electrodeposition coating composition of the present invention is preferably 5-100 mPas. A composition having a viscosity within the above-mentioned range provides a film thickness of 30 μm or above, and is preferable as a composition for electrodeposition coating that affords a uniform film thickness. The log inherent viscosity was measured by a B-type viscometer (manufactured by Toki Sangyou Co., Ltd.).

In the electrodeposition coating composition of the present invention, the average particle size of the particles comprised of block copolyimide is preferably 0.1-10 μm, more preferably 0.5-5 μm. When the average particle size is less than 0.1 μm, the Coulomb efficiency decreases and the voltage resistance is degraded due to an excess voltage. In addition, when the size exceeds 5 μm, control of the Coulomb efficiency is degraded and the voltage resistance performance is degraded by increased leakage current due to increased particle size. Therefore, the particle size of 0.5-5 μm is preferable as a range where the control of Coulomb efficiency and maintenance of voltage resistance property are balanced.

The electrodeposition coating composition of the present invention is specifically produced as follows.

Firstly, a post-polymerization composition comprising a block copolyimide obtained by the above-mentioned polymerization reaction (i.e., a composition comprising block copolyimide and a water-soluble polar solvent, wherein the content of the block copolyimide is 15-25 wt %) is melted by heating. Here, the heating temperature is generally about at 50-180° C., preferably about 60-160° C. When the heating temperature is less than 50° C., the block copolyimide is not dissolved, and is not easily dispersed in other solvents, and when it exceeds 180° C., hydrolysis occurs and the molecular weight tends to decrease.

Then, a basic compound is added to the composition after the aforementioned melting by heating, and the mixture is stirred to neutralize the block copolyimide. The composition is cooled to not more than 40° C., and a poor solvent of the block copolyimide and water are further added, and the mixture is mixed by stirring to give a suspension.

In the production step of the suspension paint composition, when the cooling temperature of the composition after neutralization of block copolyimide exceeds 40° C., polyimide tends to be decomposed by a neutralization agent. The cooling temperature of the composition is more preferably not more than 30° C. When the cooling temperature of the is composition is too low, solidification tends to occur again. Thus, the lower limit of the cooling temperature is preferably not less than 20° C.

The above-mentioned basic compound to be used is not particularly limited as long as the anionic group possessed by block copolyimide can be neutralized. Preferred is a basic nitrogen-containing compound, for example, primary amine, secondary amine and tertiary amine such as N,N-dimethylaminoethanol, triethylamine, triethanolamine, N-dimethylbenzylamine, ammonia and the like. In addition, examples include nitrogen-containing heterocyclic compounds such as nitrogen-containing 5-membered heterocyclic compounds (e.g., pyrrole, imidazole, oxazole, pyrazole, isoxazole, thiazole, isothiazole and the like); nitrogen-containing 6-membered heterocyclic compounds (e.g., pyridine, pyridazine, pyrimidine, pyrazine, piperidine, piperazine, morpholine and the like); and the like. Since aliphatic amine often has a strong odor, a nitrogen-containing heterocyclic compound having a low odor is preferable. In consideration of the toxicity of the paint, piperidine, morpholine and the like having low toxicity are preferable from among the nitrogen-containing heterocyclic compounds. The amount of the basic compound to be used is such an amount that stably dissolves or disperses the acidic group in polyimide in an aqueous solution, which is generally about 30-200 mol %, which is the theoretical neutralization amount.

Examples of the poor solvent for the above-mentioned block copolyimide include alcohol or ketone having a phenyl group, a furfuryl group or a naphthyl group, specifically, acetophenone, benzyl alcohol, 4-methylbenzyl alcohol, 4-methoxybenzyl alcohol, ethylene glycol monophenylether, phenoxy-2-ethanol, cinnamyl alcohol, furfuryl alcohol, naphthylcarbinol and the like. In addition, aliphatic alcohol is solvents are preferable since they have low toxicity, and an aliphatic alcohol solvent having an ether group is particularly preferable. Examples of the aliphatic alcohol solvent include 1-propanol, isopropyl alcohol, ethylene glycols and propylene glycols. Specific examples of the ethylene glycols and propylene glycols include dipropylene glycol, tripropylene glycol, ethylene glycol monoethylether, propylene glycol monomethylether (1-methoxy-2-propanol), propylene glycol methyletheracetate and the like. One or more kinds of these poor solvents can be used.

The amount of such poor solvent is preferably 10-40 wt %, more preferably 10-30 wt %, of the total amount of the composition. The amount of the above-mentioned water is preferably 10-30 wt %, more preferably 15-30 wt %, of the total amount of the composition.

For the purpose of controlling the viscosity of the composition and electric conductivity, an adequate amount of a water-soluble polar solvent or oil-soluble solvent may be added in addition to the above-mentioned poor solvent for block copolyimide and water. Here, specific examples of the water-soluble polar solvent include those similar to the water-soluble polar solvents to be used for the polymerization reaction of the aforementioned block copolyimide. Examples of the oil-soluble solvent include N-methylpyrrolidone, γ-butyrolactone and the like. When the oil-soluble solvent is added, the amount thereof is not more than 15 wt % relative to the total amount of the composition.

The solid content concentration of the suspension type electrodeposition coating composition of the present invention is preferably 1-15 wt %, more preferably 5-10 wt %. The content of the water-soluble polar solvent is preferably 25-60 wt %, more preferably 35-55 wt %, of the total amount of the composition.

The suspension type electrodeposition coating composition of the present invention shows high electric conductivity during the coating film forming process and can form a polyimide electrodeposited film having high uniformity on the surface of the outer circumference of the member (body to be electrodeposited) even under electrodeposition conditions at a low electric current. Moreover, since electric conductivity is high in the coating film forming process, and dispersed particles (precipitated particles) of block copolyimide are easily deposited (attached) on the outer circumferential surface of a member (body to be electrodeposited), an electrodeposited film having a large thickness can be formed, and an electrodeposited film having a thickness exceeding 20 which has been difficult to achieve in conventional polyimide electrodeposited films, can be formed.

An electrodeposition method for the electrodeposition coating composition of the present invention includes immersing a member (body to be electrodeposited) in an electrodeposition coating composition, and passing an electric current with the member (body to be electrodeposited) as a positive electrode to form a polyimide coating film on the member (body to be electrodeposited).

The electrodeposition can be performed according to the constant electric current method or constant voltage method. For example, the constant electric current method is performed under the conditions of electric current: 1.0-200 mA, direct current voltage: 5-200 V (preferably 30-120 V). In addition, while the electrodeposition time varies depending on the electrodeposition conditions, the thickness of the electrodeposited film to be formed and the like, it is generally 10-120 seconds, preferably 30-60 seconds. The temperature of the composition during electrodeposition is generally 10-50° C., preferably 10-40° C., more preferably 20-30° C. When the electrodeposition voltage is lower than 5 V, formation of a coating film by electrodeposition tends to be difficult, and when it is greater than 200 V, generation of oxygen from the coated body is intensified, thus preventing formation of a uniform coating film. When the electrodeposition time is shorter than 10 seconds, a coating film is difficult to form even when the electrodeposition voltage is set higher and pinholes are developed easily, thus degrading the voltage resistance of the electrodeposited film, and when it exceeds 120 seconds, the thickness of the coating film simply increases to cause economic disadvantages. When the composition temperature is lower than 10° C., formation of a coating film by electrodeposition tends to be difficult, and when it is higher than 50° C., the temperature needs to be controlled, thus increasing the production cost.

The coating film formed by electrodeposition is preferably dried by heating (baking). The baking preferably includes a first stage baking treatment at 70-110° C. for 10-60 min, a second stage baking treatment at 160-180° C. for 10-60 min, and further a third stage baking treatment at 200-220° C. for 30-60 min. By such three-stage baking treatment, a sufficiently dried polyimide coating closely adhered to a body to be electrodeposited (product to be film coated) with a high adhesion force can be formed.

A polyimide coating (electrodeposited film) obtained by drying with heating (baking) such electrodeposited film m (coating film) comprised of the electrodeposition coating composition of the present invention can achieve an extremely high heat resistance (thermal index by thermal index evaluation method according to JIS-C-3003 of 180° C. (Temperature Classification: Class-H), preferably not less than 200° C. is (Temperature Classification: Class-C)), and shows high extension percentage of not less than 5%, preferably not less than 8%, as measured according to JIS-C-2151.

While the material of the member (body to be electrodeposited) on the surface of which the electrodeposition coating composition of the present invention is electrodeposited is not particularly limited, copper, copper alloy, copper-clad aluminum, aluminum, zinc plated steel, silver, gold, nickel, titanium, tungsten and the like can be mentioned from the aspects of conductivity, and silver and copper are preferable. An electrodeposited film comprised of the electrodeposition coating composition of the present invention can be formed even on an insulated product as long as the surface thereof has been subjected to a conductive processing.

EXAMPLES

The present invention is explained in more detail in the following by referring to Examples.

Example 1

Block Copolyimide Solution for Electrodeposition, Containing Silicon Siloxane Component A bulb condenser provided with a water separation trap was set to a 2 L three-necked separable flask equipped with a stainless anchor-type stirrer. 3,3'4,4'-Biphenyltetracarboxylic acid dianhydride (58.84 g, 200 mmol), bis-[4-(4-aminophenoxy)phenyl]sulfone (43.25 g, 100 mmol), γ-valerolactone (4.0 g, 40 mmol), pyridine (6.3 g, 80 mmol), N-methyl-2-pyrrolidone (NMP, 531 g) and toluene (50 g) were charged therein, and the mixture was stirred at room temperature under a nitrogen atmosphere at 180 rpm for 10 min. The mixture was heated to 180° C. and stirred for 2 hr. During the reaction, the azeotropic content of toluene-water was removed. Then, the reaction mixture was cooled to room temperature, 3,3',4,4'-benzophenonetetracarboxylic acid dianhydride (64.45 g, 200 mmol), KF-8010 manufactured by Shin-Etsu Chemical Co., Ltd. (83.00 g, 100 mmol), 3,5-diaminobenzoic acid (30.43 g, 200 mmol), NMP (531 g) and toluene (50 g) were added, and the mixture was reacted for 8 hr while stirring at 180° C. and 180 rpm. The refluxed material was removed from the system to give a polyimide solution having a concentration of 20 wt % (20% polyimide varnish). The number average molecular weight and weight average molecular weight of the obtained polyimide were 24,000 and 68,000, respectively.

The obtained polyimide varnish was coated with a bar coater on a glass plate to a wet film thickness of 50 μm. Then, the varnish was dried by a hot air dryer at 90° C./30 min, 180° C./30 min and 220° C./30 min, and detached from the glass plate. The mechanical extension percentage was measured according to JIS-C-2151. As a result, the polyimide coating showed the extension percentage of 21.8% and a thermal decomposition temperature of 420° C.

The 20% polyimide varnish (100 g) obtained earlier was stirred under a nitrogen atmosphere at 160° C. for 1 hr, and rapidly cooled to 30° C. N-Methylpyrrolidone (59.4 g) and piperidine (2.2 g, neutralization degree 200 mol %) were added, and the mixture was vigorously stirred. Then, the mixture was stirred while adding propylene glycol monomethylether (129 g), and water (67 g) was added dropwise to give a solution for electrodeposition. Using a particle size analyzer ELS-Z2 (manufactured by Otsuka Electronics Co., Ltd.), the particle size and standard deviation of the particles dispersed in the solution for electrodeposition were measured. As a result, the suspension contained precipitated particles (solid particles) having a particle size of 0.7 μm and standard deviation, of 0.5 μm. The solution for electrodeposition was a cloudy solution having a solid content concentration 6.0%, pH 8.7 and electric conductivity 7.3 mS/m. The log inherent viscosity was 50 mPas.

A copper plate (25 mm×100 mm×2 mm) was electrodeposited under the following electrodeposition conditions, and then dried by a hot air dryer at 90° C./30 min, 180° C./30 min and 220° C./30 min. The rolled copper foil was removed by etching to give a polyimide electrodeposited film having a film thickness of 19 μm. The mechanical extension percentage of the electrodeposited film was measured according to JIS-C-2151 to find 7.2%.

anode-cathode distance: 3.0 cm
electrodeposition voltage: constant electric current method (30 mA)-voltage (MAX 160V)
paint temperature: 25° C.
electrodeposition time: 30 sec Using the obtained solution for electrodeposition and under the same electrodeposition conditions as above, the above-mentioned polyimide composition was electrodeposited on the outer circumference of a round copper wire (cross sectional diameter ϕ1.0 mm, length 20 cm) at 30 mA for 45 seconds.

The copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of siloxane bond-containing polyimide (average thickness 28 μm). Therefore, the film thickness per coulomb was 20 μm.

Example 2

The 20% polyimide varnish (100 g) obtained in Example 1 was stirred under a nitrogen atmosphere at 160° C. for 1 hr, and rapidly cooled to 30° C. N-Methylpyrrolidone (41.9 g) and piperidine (2.2 g, neutralization degree 200 mol %) were added, and the mixture was vigorously stirred. Then, the mixture was stirred while adding propylene glycol monomethylether (124 g), and water (49 g) was added dropwise to give a solution for electrodeposition. Using a particle size analyzer ELS-Z2 (manufactured by Otsuka Electronics Co., Ltd.), the particle size and standard deviation of the particles dispersed in the solution for electrodeposition were measured. As a result, the suspension contained precipitated particles (solid particles) having a particle size of 0.5 μm and standard deviation of 0.5 μm. The solution for electrodeposition was a cloudy solution having a solid content concentration 6.0%, pH 8.2 and electric conductivity 7.1 mS/m. The log inherent viscosity was 35 mPas.

A copper plate (25 mm×100 mm×2 mm) was electrodeposited under the same electrodeposition conditions as in Example 1 and, in the same manner as in Example 1, the electrodeposited film was dried, and the copper plate was removed by etching to give a polyimide electrodeposited film having a film thickness of 19 μm. The mechanical extension percentage of the electrodeposited film was measured according to JIS-C-2151 to find 7.2%.

Using the solution for electrodeposition and under the same electrodeposition conditions as above, the above-mentioned polyimide composition was electrodeposited on the outer circumference of a round copper wire (cross sectional diameter ϕ1.0 mm, length 20 cm) at 30 mA for 75 seconds.

The copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of siloxane bond-containing polyimide (average thickness 52 μm). Therefore, the film thickness per coulomb was 25 μm.

Example 3

The 20% polyimide varnish (100 g) obtained in Example 1 was stirred under a nitrogen atmosphere at 160° C. for 1 hr, and rapidly cooled to 30° C. N-Methylpyrrolidone (58.6 g) and piperidine (2.2 g, neutralization degree 200 mol %) were added, and the mixture was vigorously stirred. Then, the mixture was stirred while adding propylene glycol monomethylether (107 g), and water (69 g) was added dropwise to give a solution for electrodeposition. Using a particle size analyzer ELS-Z2 (manufactured by Otsuka Electronics Co., Ltd.), the particle size and standard deviation of the particles dispersed in the solution for electrodeposition were measured. As a result, the suspension contained precipitated particles (solid particles) having a particle size of 1.1 μm and standard deviation of 1.0 μm. The solution for electrodeposition was a black transparent solution having a solid content concentration 6.0%, pH 8.5 and electric conductivity 7.1 mS/m. The log inherent viscosity was 25 mPas.

A copper plate (25 mm×100 mm×2 mm) was electrodeposited under the same electrodeposition conditions as in Example 1 and, in the same manner as in Example 1, the electrodeposited film was dried, and the copper plate was removed by etching to give a polyimide electrodeposited film having a film thickness of 19 μm. The mechanical extension percentage of the electrodeposited film was measured according to JIS-C-2151 to find that the extension percentage of the obtained polyimide coating was 7.2%.

Using the obtained solution for electrodeposition and under the same electrodeposition conditions as above, the above-mentioned polyimide composition was electrodeposited on the outer circumference of a round copper wire (cross sectional diameter φ1.0 mm, length 20 cm) at 30 mA for 20 seconds.

The copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of siloxane bond-containing polyimide (average thickness 18 μm). Therefore, the film thickness per coulomb was 35 μm.

Example 4

The 20% polyimide varnish (100 g) obtained in Example 1 was stirred under a nitrogen atmosphere at 160° C. for 1 hr, and rapidly cooled to 30° C. N-Methylpyrrolidone (34.3 g) and piperidine (1.3 g, neutralization degree 100 mol %) were added, and the mixture was vigorously stirred. Then, the mixture was stirred while adding propylene glycol monomethylether (31.1 g), and water (55.6 g) was added dropwise to give a solution for electrodeposition. Using a particle size analyzer ELS-Z2 (manufactured by Otsuka Electronics Co., Ltd.), the particle size and standard deviation of the particles dispersed in the solution for electrodeposition were measured. As a result, the suspension contained precipitated particles (solid particles) having a particle size of 1.1 μm and standard deviation of 0.6 μm. The solution for electrodeposition was a cloudy solution having a solid content concentration 9%, pH 7 and electric conductivity 4.2 mS/m. The log inherent viscosity was 10 mPas.

A copper plate (25 mm×100 mm×2 mm) was electrodeposited under the same electrodeposition conditions as in Example 1 and, in the same manner as in Example 1, the electrodeposited film was dried, and the copper plate was removed by etching to give a polyimide electrodeposited film having a film thickness of 25 μm. The mechanical extension percentage of the electrodeposited film was measured according to JIS-C-2151 to find that the extension percentage of the obtained polyimide coating was 6.4%.

Using the obtained solution for electrodeposition and under the same electrodeposition conditions as above, the above-mentioned polyimide composition was electrodeposited on the outer circumference of a round copper wire (cross sectional diameter φ1.0 mm, length 20 cm) at 30 mA for 10 seconds.

The copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of siloxane bond-containing polyimide (average thickness 30 μm). Therefore, the film thickness per coulomb was 100 μm.

Example 5

The 20% polyimide varnish (100 g) obtained in Example 1 was stirred under a nitrogen atmosphere at 160° C. for 1 hr, and rapidly cooled to 30° C. N-Methylpyrrolidone (34.3 g) and piperidine (1.0 g, neutralization degree 80 mol %) were added, and the mixture was vigorously stirred. Then, the mixture was stirred while adding propylene glycol monomethylether (31.1 g), and water (55.6 g) was added dropwise to give a solution for electrodeposition. Using a particle size analyzer ELS-Z2 (manufactured by Otsuka Electronics Co., Ltd.), the particle size and standard deviation of the particles dispersed in the solution for electrodeposition were measured. As a result, the suspension contained precipitated particles (solid particles) having a particle size of 1.5 μm and standard deviation of 0.7 μm. The solution for electrodeposition was a cloudy solution having a solid content concentration 9%, pH 6.8 and electric conductivity 3.8 mS/m. The log inherent viscosity was 10 mPas.

A copper plate (25 mm×100 mm×2 mm) was electrodeposited under the same electrodeposition conditions as in Example 1 and, in the same manner as in Example 1, the electrodeposited film was dried, and the copper plate was removed by etching to give a polyimide electrodeposited film having a film thickness of 52 μm. The mechanical extension percentage of the electrodeposited film was measured according to JIS-C-2151 to find that the extension percentage of the obtained polyimide coating was 6%.

Using the obtained solution for electrodeposition and under the same electrodeposition conditions as above, the above-mentioned polyimide composition was electrodeposited on the outer circumference of a round copper wire (cross sectional diameter φ1.0 mm, length 20 cm) at 30 mA for 5 seconds.

The copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of siloxane bond-containing polyimide (average thickness 32 μm). Therefore, the film thickness per coulomb was 210 μm.

Comparative Example 1

Acrylic Resin Type Solution for Electrodeposition

Acrylonitrile (5 mol), acrylic acid (1 mol) and glycidyl methacrylate (0.3 mol) were stirred with ion exchange water (760 g), sodium lauryl sulfate ester (7.5 g) and sodium persulfate (0.13 g) in a flask at room temperature under a nitrogen atmosphere for 15-30 min, and the mixture was reacted at 50-60° C. for 3 hr to give an emulsion polymerization solution (epoxy-acrylic water dispersion varnish). Using the emulsion polymerization solution, a composition for electrodeposition was obtained.

A copper plate (25 mm×100 mm×2 mm) was electrodeposited under the same electrodeposition conditions as in Example 1 and, in the same manner as in Example 1, the electrodeposited film was dried, and the copper plate was removed by etching to give an acrylic resin electrodeposited film having a film thickness of 15 μm. The mechanical extension percentage of the electrodeposited film was measured according to JIS-C-2151 to find 0.9%.

Using the obtained solution for electrodeposition and under the same electrodeposition conditions as above, the above-mentioned acrylic resin composition was electrodeposited on the outer circumference of a round copper wire (cross sectional diameter φ1.0 mm).

Then, the copper wire electrodeposited with the acrylic resin composition was taken out from the electrodeposition bath, washed with water, and baked at 90° C. for 30 min, then at 170° C. for 30 min and further at 220° C. for 30 min to give a round insulated copper wire having an insulating layer of acrylic resin (average thickness 11 μm).

Comparative Example 2

Electrodeposition Solution of Block Copolyimide without Containing Siloxane Component The following reaction was performed using a three-necked separable glass flask equipped with a stirrer, a nitrogen inlet tube and a water receptor with a stop cock at a bottom part of a cooling tube, by heating with stirring while flowing nitrogen and immersing the reactor vessel in silicone oil. To be specific, 3,3',4,4'-benzophenonetetracarboxylic acid dianhydride (64.44 g, 0.2 mole), bis-[4-(3-aminophenoxy)phenyl]sulfone (43.25 g, 0.1 mol), valerolactone (3 g, 0.03 mole), pyridine (4.8 g, 0.06 mole), NMP (N-methylpyrrolidone, 400 g) and toluene (90 g) were placed therein, and the mixture was stirred at room temperature for 30 min. Then, the mixture was heated, and the reaction was performed while stirring at 180° C. for 1 hr at 200 rpm. After the reaction, toluene-water distillate (30 ml) was removed. The residue was cooled with air, 3,3',4,4'-benzophenonetetracarboxylic acid dianhydride (32.22 g, 0.1 mol), 3,5-diaminobenzoic acid (15.22 g, 0.1 mol), 2,6-diaminopyridine (10.91 g, 0.1 mol), NMP (222 g) and toluene (45 g) were added, and the mixture was stirred at room temperature for 1 hr (200 rpm). Then, the mixture was heated and stirred with heating at 180° C. for 1 hr. The toluene-water distillate (15 ml) was removed, after which the mixture was heated and stirred at 180° C. for 3 hr while removing the distillate from the system to complete the reaction. As a result, 20% polyimide varnish was obtained.

N-methylpyrrolidone (70 g) was added to the obtained polyimide varnish (100 g), and anisole (55 g), cyclohexanone (45 g) and methylmbrpholine (2.6 g, neutralization degree 200 mol %) were added. Water (30 g) was added dropwise with stirring to give a water-soluble solution for electrodeposition. The solution for electrodeposition was an emulsion composition having a solid content concentration of 6.6% and pH 7.8.

A copper plate (25 mm×100 mm×2 mm) was electrodeposited under the same electrodeposition conditions as in Example 1 and, in the same manner as in Example 1, the electrodeposited film was dried, and the copper plate was removed by etching to give a polyimide electrodeposited film having a film thickness of 15 μm. The mechanical extension percentage of the electrodeposited film was measured according to JIS-C-2151 to find 0.2%.

Using the solution for electrodeposition and under the same electrodeposition conditions as above, the above-mentioned polyimide composition was electrodeposited on the outer circumference of a round copper wire (cross sectional diameter φ1.0 mm).

Then, the copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of polyimide resin (average thickness 11 μm).

Comparative Example 3

Electrodeposition Solution of Random Polyimide Containing Silicon Siloxane Component To a 2 L three-necked separable flask equipped with a stainless anchor-type stirrer was set a bulb condenser provided with a water separation trap. 3,3',4,4'-Benzophenonetetracarboxylic acid dianhydride (96.67 g, 300 mmol), KF-8010 (41:50 g, 50 mmol) manufactured by Shin-Etsu Chemical Co., Ltd.), 3,5-diaminobenzoic acid (15.22 g, 100 mmol), bis[4-(3-aminophenoxy)phenyl]sulfone (21.62 g, 50 mmol), 2,4-diaminotoluene (12.22 g, 100 mmol), γ-valerolactone (4.0 g, 40 mmol), pyridine (6.3 g, 80 mmol), N-methyl-2-pyrrolidone (NMP, 706 g) and toluene (80 g) were charged therein, and the mixture was reacted for 6 hr while stirring at room temperature at 180 rpm under a nitrogen atmosphere. The refluxed material was removed from the system to give a polyimide varnish having a concentration of 20%.

N-Methylpyrrolidone (90 g) was added to the obtained polyimide varnish (100 g), and anisole (55 g), cyclohexanone (50 g) and methylmorpholine (2.6 g, neutralization degree 200 mol %) were added. Water (35 g) was added dropwise with stirring to give a water-soluble solution for electrodeposition. The solution for electrodeposition was an electrodeposition composition having a solid content concentration 5.1% and pH 8.0.

A copper plate (25 mm×100 mm×2 mm) was electrodeposited under the same electrodeposition conditions as in Example 1 and, in the same manner as in Example 1, the electrodeposited film was dried, and the copper plate was removed by etching to give a polyimide electrodeposited film having a film thickness of 15 μm. The mechanical extension percentage of the electrodeposited film was measured according to JIS-C-2151 to find 1.0%.

Using the solution for electrodeposition and under the same electrodeposition conditions as above, the above-mentioned polyimide composition was electrodeposited on the outer circumference of a round copper wire (cross sectional diameter φ1.0 mm).

The copper wire electrodeposited with the polyimide composition was taken out from the electrodeposition bath, washed with water, and baked at 90° C. for 30 min, then at 170° C. for 30 min and further at 220° C. for 30 min to give a round insulated copper wire having an insulating layer of polyimide resin (average thickness 11 μm).

[Performance Evaluation]

The insulated copper wires produced in Examples 1-5 and Comparative Examples 1-3 were subjected to the following evaluation tests.

1. Heat Resistance Test

Heat resistance was evaluated by a thermal index is evaluation method according to JIS-C-3003.

2. AC Voltage Resistance Test

Measured by a dielectric breakdown method (method B metallic foil method) according to JIS-C-3003. An average of 10 measured values was taken as the evaluation results, wherein a value exceeding 2.0 kV was marked with ○ (accepted), a value exceeding not more than 2.0 kV was marked with x (failed).

TABLE 1

|  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|
| film thickness (μm) | 28 | 52 | 18 | 30 | 32 | 22 | 11 | 15 |
| heat resistance index | CLASS-C | CLASS-C | CLASS-C | CLASS-C | CLASS-C | CLASS-F | CLASS-C | CLASS-C |
| film extension percentage (%) | 7.2 | 5.3 | 5.5 | 6.4 | 6 | 0.9 | 0.2 | 1 |
| AC-voltage resistance | ○ | ○ | ○ | ○ | ○ | X | X | X |

INDUSTRIAL APPLICABILITY

Using the solution composition for electrodeposition of the present invention, a high-insulation electrodeposited film having good heat resistance, good flexibility and good adhesiveness to a body to be electrodeposited can be formed in a shorter time than with conventional compositions. In addition, since an insulation film (layer) having high level heat resistance can be realized with a comparatively thin film, which has been difficult to achieve with conventional solutions for electrodeposition, it acts advantageously for miniaturization or low-profiling of members (parts) requiring an insulating layer in various technical fields such as automobile parts, home electric appliances, electric and electronic materials, building materials, copper wiring for print substrate and the like when an insulating layer (film) is formed on such members (parts). Moreover, since an insulation film (layer) having a thickness conventionally difficult to achieve can be formed, the insulation film (layer) also has a scratch protection function (resistance to scratch). Hence, using the solution composition for electrodeposition of the present invention, a scratch protection layer is also expected to be omitted from members (parts) conventionally requiring a protection layer against scratches together with an insulating layer for insulation protection.

This application is based on a patent application No. 2007-122723 filed in Japan, the contents of which are incorporated in full herein by this reference.

The invention claimed is:

1. A suspension electrodeposition coating composition comprising a block copolyimide having a siloxane bond in a molecular structure and an anionic group in a molecule as a resin component, the suspension electrodeposition coating composition, which comprises the block copolyimide, a basic compound, a water-soluble polar solvent, water and a poor solvent for the block copolyimide, wherein the concentration of the block copolyimide to the total composition is 1-15 wt %, the content ratio of the water-soluble polar solvent to the total composition is 25-60 wt %, the content ratio of water to the total composition is 10-30 wt %, the content ratio of the poor solvent to the total composition is 10-40 wt %, and the content ratio of the basic compound is 30-200 wt % to the stoichiometric amount necessary to neutralize an acid group in the block copolyimide, and wherein the block copolyimide dispersed in the suspension has an average particle size of 0.5-5 μm with a standard deviation of 0.1-8 μm.

2. The suspension electrodeposition coating composition of claim 1, wherein the block copolyimide comprises, as one of the diamine components, diamine having a siloxane bond in a molecular structure.

3. The suspension electrodeposition coating composition of claim 2, wherein the diamine is one or more kinds selected from the group consisting of bis(4-aminophenoxy)dimethylsilane, 1,3-bis(4-aminophenoxy)-1,1,3,3-tetramethyldisiloxane and a compound represented by the following formula (I):

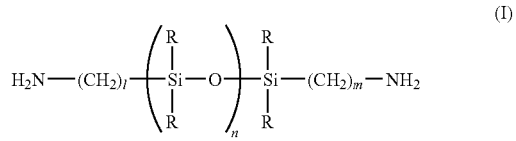

wherein four R's are each independently an alkyl group, a cycloalkyl group, a phenyl group or a phenyl group substituted by 1 to 3 alkyl groups or alkoxyl groups, l and m are each independently an integer of 1-4, and n is an integer of 1-20.

4. The suspension electrodeposition coating composition of claim 3, wherein the four R's in the formula (1) are each independently an alkyl group having a carbon number of 1 to 6, a cycloalkyl group having a carbon number of 3 to 7, a phenyl group, or a phenyl group substituted by 1 to 3 alkyl groups having a carbon number of 1 to 6 or 1 to 3 alkoxyl groups having a carbon number of 1 to 6.

5. The suspension electrodeposition coating composition of claim 1, wherein the anionic group is a carboxylic acid group or a salt thereof, or a sulfonic acid group or a salt thereof.

6. The suspension electrodeposition coating composition of claim 5, wherein the block copolyimide comprises, as one of the diamine components, aromatic diaminocarboxylic acid.

7. The suspension electrodeposition coating composition of claim 6, wherein, in the block copolyimide, the proportion of the diamine having a siloxane bond in a molecular structure to the total diamine content is 5-90 mol % and the proportion of the aromatic diaminocarboxylic acid to the total diamine component is 10-70 mol %, provided that the total of the both is 100 mol % or below and a third diamine component may be contained.

8. The suspension electrodeposition coating composition of claim 1, wherein the poor solvent for the block copolyimide is alkoxy-substituted aliphatic alcohol.

9. The suspension electrodeposition coating composition of claim 1, wherein the basic compound is a basic nitrogen-containing compound.

10. The suspension type electrodeposition coating composition of claim 9, wherein the basic nitrogen-containing compound is a nitrogen-containing heterocyclic compound.

11. The suspension electrodeposition coating composition of claim 1, capable of forming a polyimide coating at 15-250 µM per coulomb by electrodeposition using a copper wire with a cross sectional diameter of 1.0 mm and a length of 20 cm.

12. The suspension electrodeposition coating composition of claim 1, having a log inherent viscosity of 5-100 mPa·s.

13. An anion electrodeposition method comprising immersing a body to be electrodeposited, which is comprised of a member having at least a conductive surface, in the suspension electrodeposition coating composition of claim 1 and passing an electric current using the body to be electrodeposited as a positive electrode to form a polyimide coating film on the body to be electrodeposited.

* * * * *